US005521509A

United States Patent [19]

Ishikawa et al.

[11] Patent Number: 5,521,509

[45] Date of Patent: May 28, 1996

[54] DEVICE OF ESTIMATING HEAT RESISTIVITY FOR A SPARK PLUG AND A METHOD OF ESTIMATING THE SAME

[75] Inventors: Masahiro Ishikawa; Yoshihiro Matsubara, both of Nagoya, Japan

[73] Assignee: NGK Spark Plug Co., Ltd., Nagoya, Japan

[21] Appl. No.: 407,377

[22] Filed: Mar. 20, 1995

[30] Foreign Application Priority Data

Dec. 12, 1994 [JP] Japan .................................... 6-307849

[51] Int. Cl.[6] ............................ F02P 17/00; G01M 19/02

[52] U.S. Cl. ........................... 324/393; 324/391; 324/399

[58] Field of Search .................................... 324/380, 391, 324/393, 399; 73/116, 117.3; 123/425

[56] References Cited

U.S. PATENT DOCUMENTS

| | | | |
|---|---|---|---|
| 4,716,874 | 1/1988 | Hilliard et al. | 123/425 |
| 4,987,771 | 1/1991 | Iwata | 324/393 X |
| 5,206,809 | 4/1993 | Iwakiri et al. | 123/425 X |
| 5,311,765 | 5/1994 | Iwakiri | 73/116 X |

OTHER PUBLICATIONS

Classification and Selection of the Heat Ranges of Spark Plugs for Internal–Combustion Engines, Otto Beesch, pp. 1–5, Jan. 26, 1972.

*Primary Examiner*—Kenneth A. Wieder
*Assistant Examiner*—Diep Do
*Attorney, Agent, or Firm*—Sughrue, Mion, Zinn, Macpeak & Seas

[57] ABSTRACT

In a device of estimating heat resistivity for a spark plug, an ignition spark control circuit is provided to discontinue ignition spark across electrodes of a spark plug at a predetermined intervals. A counter circuit is provided to count the times of the ignition spark suppressed by the ignition spark control circuit. A self-ignition detection circuit is provided to detect the self-ignition from the spark plug when the ignition spark is suppressed by the ignition spark control circuit. A self-ignition counter circuit is provided to count the numbers of the self-ignition detected by the self-ignition detection circuit. A calculation circuit is provided to calculate occurrences rate of the self-ignition from the spark plug on the basis of the suppressing numbers of the ignition spark counted by the counter circuit and the detecting numbers of the self-ignition counted by self-ignition counter circuit. A self-ignition timing detection circuit is provided to detect a detection timing of the self-ignition detected by the self-ignition detection circuit. A preignition timing anticipating circuit is provide to anticipate an ignition timing when preignition of the internal combustion engine occurs on the basis of the occurrence rate of the self-ignition detected by the calculation circuit and detecting timing of the self-ignition detected by the self-ignition timing detection circuit.

4 Claims, 2 Drawing Sheets

DEVICE OF ESTIMATING HEAT RESISTIVITY FOR A SPARK PLUG AND A METHOD OF ESTIMATING THE SAME

BACKGROUND OF THE INVENTION

1. Field of the Invention

This invention relates to a method of estimating heat resistivity for a spark plug and a device of estimating the same which makes use of ignition manners represented by an ignition type internal combustion engine.

2. Description of Prior Art

In general, it is necessary to select some heat value for a spark plug which enables to normally operate an internal combustion engine under every condition, since a heat range depends on the heat value in which the spark plug works normally in the ignition type internal combustion engine. A method of detecting of preignition has been utilized to recognize an allowance of the heat range up to a upper limit as a way of estimating a heat resistivity for the spark plug.

The so-called preignition is one of the ignition manners represented by the ignition type internal combustion engine in which an air-fuel mixture gas is ignited prematurely by a hot spot (insulator surface in general) of the spark plug before a discharge spark occurs across the electrodes of the spark plug. This type of the preignition is uncontrollable. The method of detecting of preignition means to check a heat resistivity for the spark plug as referred to a method of estimating heat resistivity. In this method, the preignition is generally induced by advancing the ignition timing to increase a heat load imposed on the spark plug, and thus rises its temperature so as to measure a thermal allowance of the spark plug. The advantage of this method is to directly recognize the allowance of heat resistivity for the spark plug to be measured.

However, when the ignition timing is advanced so far as to cause the preignition, this induces a rapid temperature rise within a combustion chamber of the internal combustion engine, and the repetitive occurrences of the preignition poses a problem to do damage seriously on the internal combustion engine. In such an internal combustion engine as the ignition timing is determined in the proximity of knocking limit by a knocking control system or the like, an advanced allowance of the ignition timing is very restricted so that the allowance of the heat resistivity is not directly recognized since the heat value is assumed by using lower heat rating of the spark plug than presupposedly used.

Aside from the preignition method, a postignition method has been utilized which estimates a heat compatibility without changing the ignition timing. The postignition method is one of the ignition manners other than the preignition in which the air-fuel mixture gas is ignited after the discharge spark occurs across the electrodes of the spark plug. This manner of the postignition is further divided into two types. One is controlled ignition as caused by the normal ignition spark, and another is ignition uncontrollable by the ignition spark (self-ignition). The latter type of the uncontrollable ignition is generally caused from the heat surface in which deposits are placed on the spark plug and the combustion chamber of the internal combustion engine.

The postignition method is generally referred to the latter type of the uncontrollable ignition which utilizes the ignition from the hot spot of the spark plug so as to check the heat resistivity for the spark plug. In the postignition method, when the ignition spark is suppressed at a normal advancement of ignition at regular intervals on the assumption that the ignition does not occur due to the deposits on the hot spot of the spark plug or the like, a rate of the postignition occurrence is determined on the basis of the occurrences of the postignition so as to measure a degree of the thermal allowance of the spark plug. The advantage of the postignition method is to estimate the heat value without advancing the ignition, thus obviating the serious damage on the internal combustion engine as done in the preignition method.

However, in this type of postignition method, the thermal allowance of the spark plug is recognized to examine whether or not the heat value of the spark plug is appropriate only in the rate of the postignition occurrence.

TABLE 1

| | postignition occurrence rate at ignition timing of 20° BTDC | ignition timing in which preignition actually occurs (heat value) |
|---|---|---|
| spark plug A | 33.8% | 31° BTDC |
| spark plug B | 70.2% | 31° BTDC |

In the spark plugs A, B of different internal structure, but same heat value as shown in TABLE 1, the rate of the postignition occurrence differs between the spark plugs A, B when the ignition timing is measured in terms of 20° BTDC (Before Top of Dead Center) because the former falls on 33.8%, and the latter 70.2%. By way of illustration, when the heat value of the spark plug is appropriate below 50% rate of the postignition occurrence, the spark plug B is mistaken for having a lower heat value although the spark plugs A, B are of the same heat value.

Therefore, it is one of the objects of the invention to provide a method of estimating heat resistivity for a spark plug and a device of estimating the same which is capable of measuring a heat resistivity of a spark plug without doing serious damage on an internal combustion engine, and without changing an ignition timing in which a discharge spark occurs across electrodes of the spark plug.

It is also one of the objects of the invention to provide a method of estimating heat resistivity for a spark plug and a device of estimating the same which is capable of anticipating an ignition timing in which a preignition occurs from the spark plug.

Further, it is one of the objects of the invention to provide a method of estimating heat resistivity for a spark plug and a device of estimating the same which is capable of correctly selecting a heat value compatible with the spark plug by estimating its heat resistivity.

SUMMARY OF THE INVENTION

According to the invention, there is provided a method of estimating heat resistivity for a spark plug, comprising: (a) a first step of detecting self-ignition an internal combustion engine when ignition spark across electrodes of a spark plug is suppressed; (b) a second step of determining occurrences rate of the self-ignition in the internal combustion engine on the basis of the detecting numbers of the self-ignition and the suppressing counts of the ignition spark which is detected by the first step; (c) a third step of anticipating an ignition timing when preignition of the internal combustion engine will occur on the basis of the occurrences rate of the self-ignition and detecting timing of the self-ignition in the internal combustion engine; and (d) a fourth step of estimating heat resistivity allowance of the spark plug on the basis of the ignition timing in which the preignition is anticipated in the third step.

According further to the invention, there is provided a method of estimating heat resistivity for a spark plug in which the self-ignition in the internal combustion engine detected by the first step is based on ionic current.

According still further to the invention, there is provided a device of estimating heat resistivity for a spark plug, comprising: (a) an ignition spark control means provided to suppress an ignition spark across electrodes of a spark plug at a predetermined intervals; (b) a counter means provided to count the numbers of the ignition spark which is suppressed by the ignition spark control means; (c) a self-ignition detection means provided to detect the self-ignition from the spark plug when the ignition spark is suppressed by the ignition spark control means; (d) a self-ignition counting means provided to count the numbers of the self-ignition detected by the self-ignition detection means; (e) a calculation means provided to calculate occurrence rate of the self-ignition from the spark plug on the basis of the suppressing numbers of the ignition spark counted by the counter means and the detecting numbers of the self-ignition counted by self-ignition counter means; (f) a self-ignition timing detection means provided to detect a detecting timing of the self-ignition which is detected by the self-ignition detection means and (g) a preignition timing anticipating means provide anticipate an ignition timing when preignition of the internal combustion engine occurs on the basis of the occurrence rate of;the self-ignition detected by the calculation means and detecting timing of the self-ignition detected by the self-ignition timing detection means.

According stillmore to the invention, there is provided a device of estimating heat resistivity for a spark plug in which a heat resistivity distinction means is provided to recognize heat resistivity allowance based on an ignition timing in which an ignition spark occurs across electrodes of the spark plug, and an ignition timing in which the preignition occurs from the spark plug as anticipated by the preignition timing anticipating means.

With the structure of the invention, the ignition timing is anticipated in which the preignition occurs on the basis of the detecting timing of the self-ignition and the occurrence rate of the self-ignition determined by the suppressing numbers of the ignition spark.

On the basis of the ignition timing in which the preignition is anticipated, an allowance degree of the heat resistivity of the spark plug is estimated, thus making it possible to estimate the heat resistivity of the spark plug without changing the ignition timing and doing serious damage on the internal combustion engine.

With the equipment of the ignition spark control means, it is possible to suppress the ignition spark at regular intervals so as to count the suppressing numbers of the ignition spark by the ignition spark suppressing counter circuit. With the assist of the self-ignition detecting circuit, the self-ignition is detected when the ignition spark is suppressed, and the detecting numbers of the self-ignition is counted by the self-ignition counter. With the provision of the calculation circuit the occurrence numbers of the self-ignition from the spark plug is calculated on the basis of the suppressing numbers of the ignition spark and the detecting numbers of the self-ignition. The detecting timing of the self-ignition is detected by the self-ignition timing detecting circuit. By means of the preignition timing anticipating circuit, it is possible to anticipate an ignition timing when preignition of the internal combustion engine occurs on the basis of the occurrence rate of the self-ignition detected by the calculation circuit and detecting timing of the self-ignition detected by the self-ignition timing detection circuit. This makes it possible to estimate the heat resistivity of the spark plug without changing the ignition timing and doing serious damage on the internal combustion engine.

With the provision of the heat resistivity distinction circuit, it is possible to recognize heat resistivity allowance based on an ignition timing in which an ignition spark occurs across electrodes of the spark plug, and an ignition timing in which the preignition occurs from the spark plug as anticipated by the preignition timing anticipating circuit.

The above and other objects, features and advantages of the present invention will be apparent from the following detailed description of the preferred embodiments of the invention in conjunction with the accompanying drawings.

DETAILED DESCRIPTION OF PREFERRED EMBODIMENT OF THE INVENTION

Figure 1:
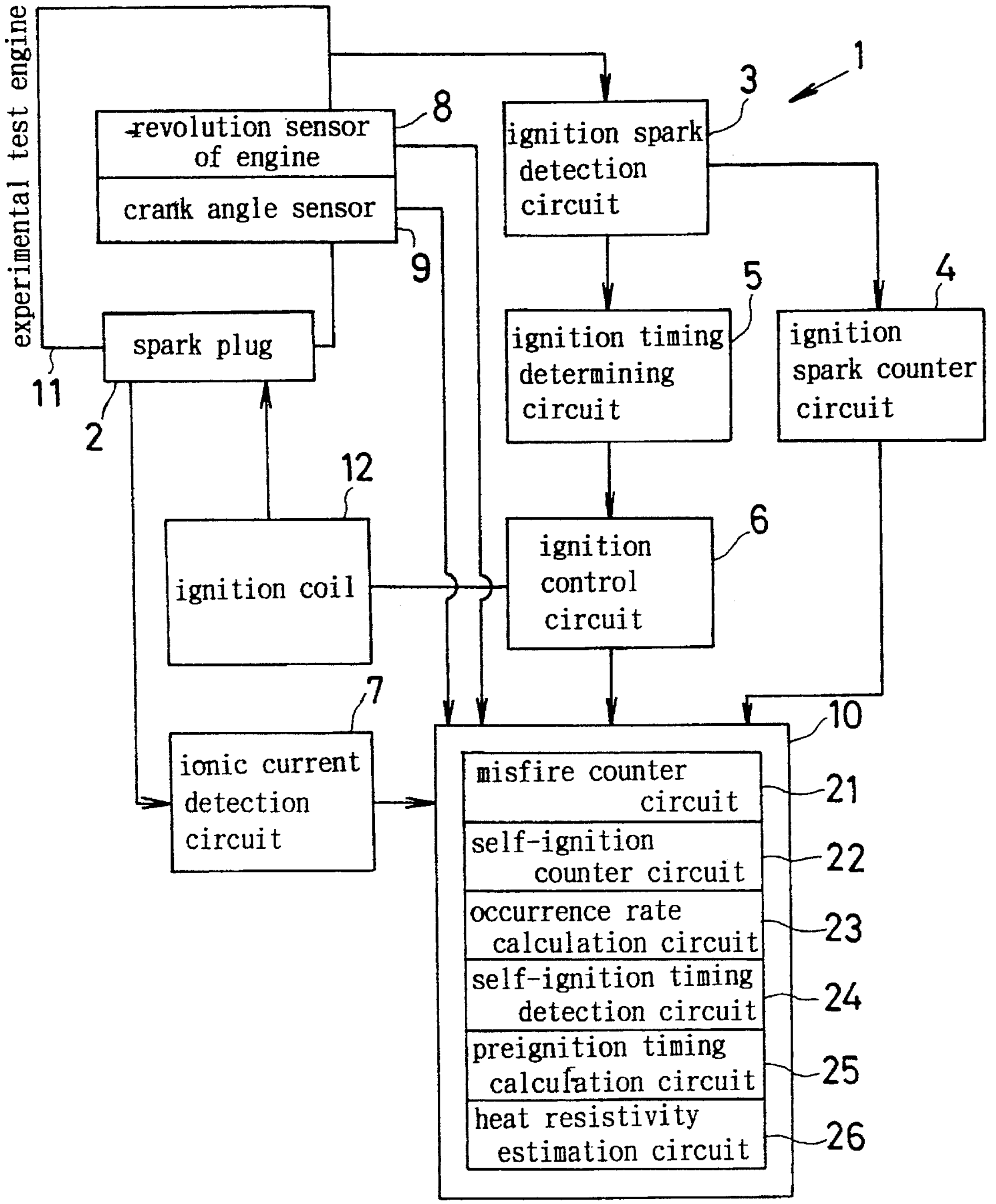
FIG. 1 is a block diagram according to an embodiment of the invention.

With the reference of drawings, an embodiment of the invention is described. Referring to FIG. 1 which shows a postignition measuring device 1 of a device of estimating a heat resistivity of a spark plug 2, the postignition measuring device 1 is to select a heat value compatible with the spark plug 2 by measuring a thermal allowance of the heat resistivity of the spark plug 2. The postignition measuring device 1 includes an ignition spark detecting circuit 3, an ignition spark counter circuit 4, an ignition timing determining circuit 5, an ignition control circuit 6, an ionic current detecting circuit 7, an engine revolution sensor 8, a crank angle sensor 9 and a postignition distinction circuit 10. On a cylinder of an experimental test engine 11, the spark plug 2 is mounted across which a high voltage is applied by means of an ignition coil 12.

The ignition spark detecting circuit 3 serves as an ignition spark detecting means which detects whether or not the ignition spark occurs by detecting whether or not a secondary voltage signal (high voltage signal) is presence which is applied to the spark plug 2 by way of the ignition coil 12.

The ignition spark counter circuit 4 works as an ignition spark counter means which counts occurrence of ignition spark detected by the ignition spark detecting circuit 3.

The ignition timing determining cirucit 5 functions as an ignition timing determining means which determines an ignition timing at a predetermined time to establish a discharge spark across the electrodes of the spark plug 2.

The ignition control circuit 6 acts as an ignition control means which controls the ignition timing, at the same time, serving as a misfire controlling means which suppress the ignition spark once when an occurrence of the ignition spark comes to a constant. In this instance, it is observed that the ignition spark may be suppressed at the rate of every e.g., 1.2 sec.

The ionic current detecting circuit 7 includes a high voltage diode, and works as a self-ignition detecting means which detects whether or not a postignition self-ignition occurs from an insulator surface of the spark plug 2 by detecting whether or not an ionic current is present between the electrodes of the spark plug 2.

The engine revolution sensor 8 is of well-known structure which detects a revolution (NE) of an experimental test engine 11, and feeds a revolution signal to the postignition distinction circuit 10.

The crank angle sensor 9 is also of well-known structure which detects a crank angle G (crank position) of the experimental test engine 11, and feeds a crank angle signal to the postignition distinction circuit 10.

The postignition distinction circuit 10 includes a misfire counter circuit 21, a self-ignition counter circuit 22, an occurrence rate calculation circuit 23, a self-ignition timing detection circuit 24, a preignition timing calculation circuit 25 and a heat resistivity estimation circuit 28. The misfire counter circuit 21 acts as a spark suppressing number counting circuit which counts the suppressing numbers of the ignition spark suppressed by the ignition control circuit 6.

The self-ignition counter circuit 22 serves as a self-ignition counter means which counts the detecting numbers of the ionic current (postignition) detected by the ionic current detecting circuit 7.

The occurrence rate calculation circuit 23 works as an occurrence rate calculation means which calculates an occurrence rate (H) of the postignition on the basis of the suppressing numbers (c) of the ignition spark suppressed by the misfire counter circuit 21, and the detecting numbers (p) of the postignition counted by the self-ignition counter circuit 22.

The self-ignition timing detection circuit 24 acts as a self-ignition timing detection means which detects an occurrence timing of the postignition by measuring a time (delay time of hot-spot ignition) from the actual timing set by the ignition timing determining circuit 5 until the ionic current is detected by the ionic current detection circuit 7.

The preignition timing calculation circuit 25 serves as a preignition timing anticipating means provided to anticipate an ignition timing (P) in which the preignition occurs. The ignition timing (P) is calculated based on an average value (t) of the postignition timing and the occurrence rate (H) of the postignition calculated by the occurrence rate calculation circuit 23.

The heat resistivity estimation circuit 26 serves as a heat resistivity distinction means provided to recognize the heat resistivity (compatible heat value) of the spark plug 2 by comparing the ignition timing (P) calculated by the preignition timing calculation circuit 25 with the thermal allowance of a heat resistivity (F) (e.g., 10° ~20° ).

Figure 2:
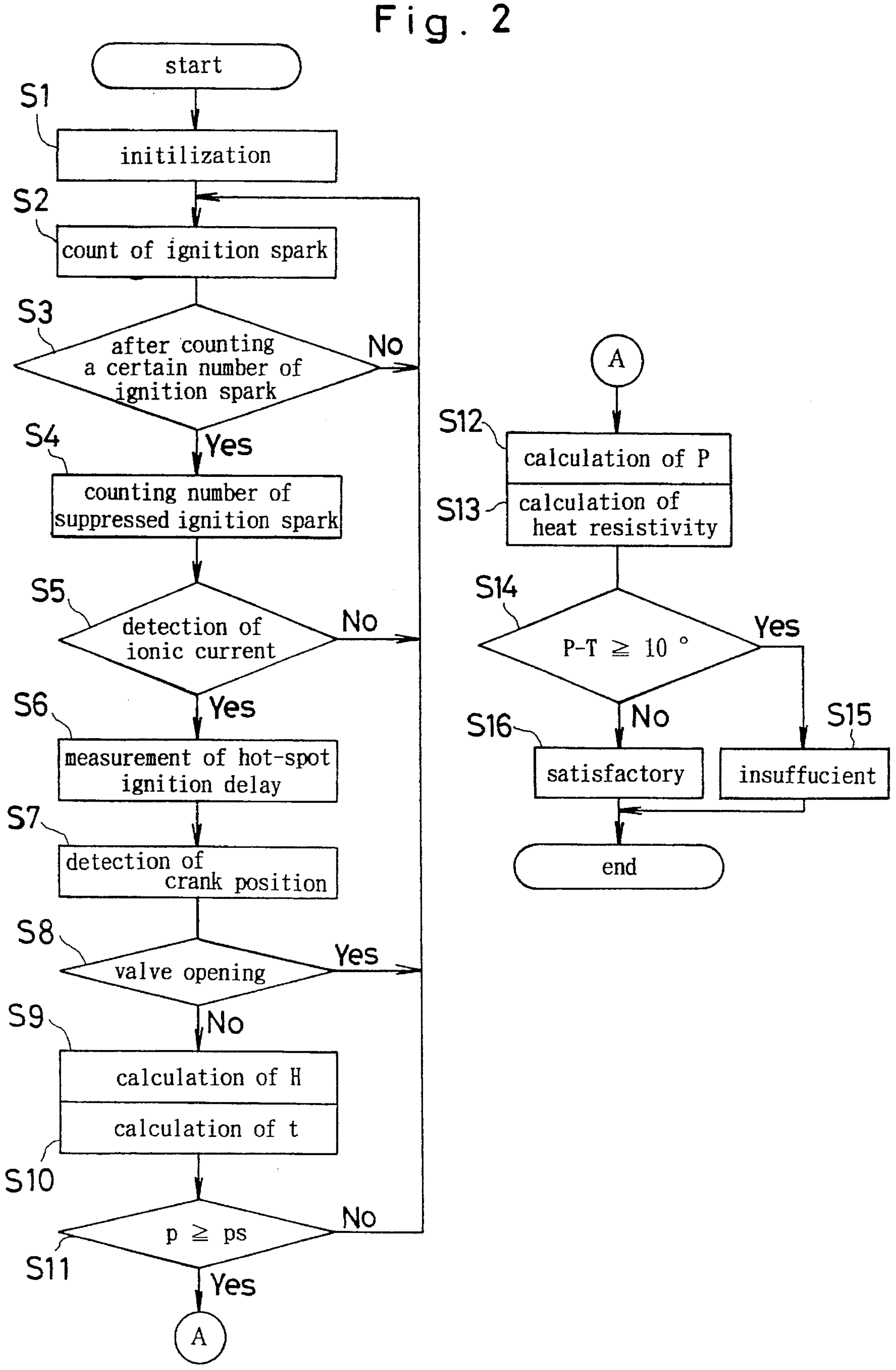
FIG. 2 is a flow chart showing a method of estimating a heat resistivity of a spark plug according to an embodiment of the invention.

With the structure of the postignition measuring device 1 thus far described, the postignition measuring device 1 is operated in accordance with a flow chart shown in FIG. 2 which depicts a method of estimating the heat resistivity of the spark plug 2. In this instance, the postignition is measured at every 2.5 CA of the crank angle, and carried out after a flying interval (e.g., 30 sec) to thermally stabilize the spark plug 2 when resumed under different conditions.

STEP 1

Firstly, initializing is carried out at step 1.

STEP 2

Then, the ignition spark across the electrodes of the spark plug 2 is detected by the ignition spark detection circuit 3, and the number of the ignition sparks is counted by the ignition spark counter circuit 4.

STEP 3

It is recognized whether or not the counting number of the ignition sparks amounts to a predetermined count. Otherwise, it is recognized whether or not a predetermined time (e.g, 1.2 sec) is passed. When the answer is in the negative, the procedure returns to step 2.

STEP 4

Upon answering in the affirmative at step 3, the procedure returns to step 4 in which the ignition spark is suppressed by the ignition control circuit 6 so as to count the suppressing number of the ignition sparks suppressed by the misfire counter circuit 21.

STEP 5

In step 5 (first step), it is recognized whether the ionic current is detected by the ionic current detection circuit 7. When the answer is in the negative, the procedure returns to step 2.

STEP 6

Upon answering in the affirmative at step 5, the procedure returns to step 6 to measure the hot-spot ignition delay time from the actual timing (T) set by the ignition timing determining circuit 5 until the ionic current is detected by the ionic current detection circuit 7.

STEP 7

Based on the revolution (NE) of the engine, is a crank angle determined which corresponds to the hot-spot ignition delay time. The crank angle is calculated by the ignition timing (T) when the ionic current is detected.

STEP 8

It is recognized whether the detected ionic current is due to an entry of exhaust gas invited from other cylinder when an exhaust valve of the experimental test engine 11 is opened. That is, it is recognized whether the crank angle detected by the crank angle sensor 9 is before or after 120° ~140° after the top dead center (TDC) at the time when the ionic current is detected. Upon answering in the affirmative, the procedure returns to step 2 without resorting to the self-ignition counter circuit 22. When answering in the negative at step 8, the procedure advances to step 9 (second step).

STEP 9

Based on the suppressing numbers (c) of the ignition spark suppressed by the misfire counter circuit 21 and the detecting numbers (p) of the postignition counted by the self-ignition counter circuit 22, the occurrence rate of the postignition (H) is calculated as follows:

$$H=p/c$$

STEP 10

In step 10, the hot-spot delay time is calculated to produce the average value (t) of the postignition occurrence timing.

STEP 11

Then, it is recognized whether or not the number of the sample is statistically significant. Namely, it is recognized whether or not the occurrence number (p) of postignition comes to a predetermined value (ps: e.g., 300 ~500 times). When answering in the negative, the procedure returns to step 2. Upon answering in the affirmative, the procedure advances to step 12.

STEP 12

In step 12 (third step), based on the average value (t) of the postignition timing detected by the self-ignition timing detection circuit 24 of the preignition timing calculation circuit 25 and the occurrence rate (H) of the postignition calculated by the occurrence calculation circuit 23, the ignition timing (P) is anticipated in accordance with the following equation.

$$P=a\times T+b\times t+c\times H$$

Where,

P=an ignition timing in which the anticipated preignition occurs,

T=a term including an actual ignition timing attained when a postignition test is carried out, t=a term including a postignition occurrence timing attained when a postignition test is carried out, H=a term including a postignition occurrence rate attained when a postignition test is carried out, a, b and c=constant.

STEP 13

Then, based on the ignition timing (P) calculated by the preignition timing calculation circuit 25 of the heat resistivity estimation circuit 26 and the thermal allowance of the predetermined heat resistivity F (e.g., 10° ~20°), the heat resistivity (compatible heat value) is calculated by the following expression.

$$P-T \geqq F$$

Where,

P=the ignition timing in which the anticipated preignition occurs,

T=the actual ignition timing attained (experimental test advancement of ignition) when the postignition test is carried out, F=a thermal allowance of the heat resistivity (e.g., 10° ).

STEP 14

Then, it is recognized whether or not the expression P–T≧10° is satisfied. Namely, it is determined whether or not the heat value of the spark plug 2 is compatible based on the ignition timing (P) in which the anticipated preignition occurs.

STEP 15

Upon replying to step 14 in the affirmative, it is determined in step 15 (fourth step) that the thermal allowance of the spark plug 2 is satisfactory under the present conditions. When answering in the negative, it is determined in step 15 (fourth step) that the thermal allowance of the spark plug 2 is insufficient under the present conditions.

TABLE 2 depicts the postignition occurrence rate and the ignition timing of the preignition occurrence anticipated by the postignition and the postignition occurrence rate. For this purpose, an experimental test is carried out with spark plugs A, B mounted on the four types of engines E1, E2, E3 and E4. The spark plugs A, B are of different internal structure, but of the same heat value which means that the spark plugs A, B have the same ignition timing in which the preignition occurs.

Various dimensions of the engines E1, E2, E3 and E4 used in the experimental test are indicated by TABLE 3, and dimensions of the spark plugs A, B are by TABLE 4. The engines E1, E2 are for a natural intake type automotive vehicle, and the engine E3 for a light automotive vehicle with a turbocharger. The engine E4 is for an air-cooling type two-wheel vehicle.

The leg length in TABLE 4 indicates a dimension from a front end of a firing portion of an insulator to a shouldered seat of a metallic shell. A diametrical difference indicates a dimension between an outer diameter of a center electrode and an inner diameter of an axial bore of the firing portion of the insulator. The center electrode includes a composite electrode structure consisting an alloyed metal and a copper core cladded by the alloyed metal (Ni-1.5 Si-1.5 Cr-2 Mn).

TABLE 2

| engine (Ig · T = ignition timing) | spark plug | postignition occurrence rate | ignition timing in which preignition actually occurs | ignition timing in which anticipated preignition occurs |
|---|---|---|---|---|
| E1 (5000 rpm) | A | 33.8% | 31° BTDC | 31.6° BTDC |
| (Ig · T = 32° BTDC) | B | 70.2% | 31° BTDC | 30.1° BTDC |
| E2 (3500 rpm) | A | 38.0% | 44° BTDC | 45.4° BTDC |
| (Ig · T = 20° BTDC) | B | 75.6% | 44° BTDC | 44.3° BTDC |
| E3 (7300 rpm) | A | 31.6% | 33° BTDC | 32.4° BTDC |
| (Ig · T = 20° BTDC) | B | 87.6% | 33° BTDC | 31.6° BTDC |
| E4 (9000 rpm) | A | 53.4% | 36° BTDC | 36.4° BTDC |
| (Ig · T = 25° BTDC) | B | 99.8% | 36° BTDC | 35.3° BTDC |

TABLE 3

| | engine E1 | engine E2 | engine E3 | engine E4 |
|---|---|---|---|---|
| displacement ($cm^3$) | 1997 | 2500 | 659 | 124 |
| bore × stroke (mm) | 81 × 95 | 84 × 75 | 68 × 60.5 | 56.5 × 49.5 |
| compression ratio (ε) | 9.4 | 10.0 | 8.0 | 9.4 |
| number of valve/ cylinder | 4 | 4 | 4 | 2 |
| max. output (PS/rpm) | 145/6000 | 192/5900 | 64/7500 | 14/10000 |
| max. torque (kgm/rpm) | 17.8/4500 | 25.0/4700 | 9.4/4000 | 1.0/9000 |
| intake system | NA | NA | TC | NA |

TABLE 4

| | spark plug A | spark plug B |
|---|---|---|
| leg length (mm) | 16 | 17 |
| diametrical difference | 0.135 | 0.094 |
| constituent of insulator | 94.8% alumina by weight | 94.8% alumina by weight |
| center electrode | composite structure | composite structure |

As shown in TABLE 2, it is found that the postignition occurrence rate differs significantly between the four engines E1, E2, E3 and E4. Taking the ignition timing of the preignition occurrence calculated on the postignition occurrence rate and the timing of the postignition occurrence into consideration, it is confirmed that this ignition timing is substantially the same as the ignition timing of the preignition occurrence actually detected by gradually advancing the ignition.

This means that the heat value inherent in the spark plug is measured by the postignition method. Namely, it is possible to anticipate the ignition timing of the preignition occurrence by taking the ignition timing of the preignition occurrence calculated on the postignition occurrence rate and the timing of the postignition occurrence into consideration. This leads to precisely measure the heat value of the spark plug.

After checking 36 types of 102 spark plugs as regard to the engines E1, E2, E3 and E4, a slight difference of ±2° CA is observed in terms of crank angle between the ignition timing in which the preignition occurs actually and the ignition timing measured according to the present post ignition method.

Therefore, the post ignition method obviates the possibility of inviting erorrs at the time when selecting the compatible heat value of the spark plug only by the post ignition occurrence rate, and thus apparently making it possible to precisely measure the compatible heat value of the spark plug.

While the invention has been described with reference to the specific embodiment, it is understood that this description is not to be construed in a limiting sense in as much as various modifications and additions to the specific embodiment may be made by skilled artisans without departing from the spirit and scope of the invention.

What is claimed is:

1. A method of estimating heat resistivity for a spark plug, comprising:

(a) a first step of detecting self-ignition in an internal combustion engine when ignition spark across electrodes of a spark plug is suppressed;

(b) a second step of determining occurrences rate of the self-ignition in the internal combustion engine on the basis of the detecting numbers of the self-ignition and the suppressing counts of the ignition spark which is detected by the first step;

(c) a third step of anticipating an ignition timing when preignition of the internal combustion engine will occur on the basis of the occurrences rate of the self-ignition and detecting timing of the self-ignition in the internal combustion engine; and (d) a fourth step of estimating heat resistivity allowance of the spark plug on the basis of the ignition timing in which the preignition is anticipated in the third step.

2. A method of estimating heat resistivity for a spark plug according to claim 1, wherein the self-ignition in the internal combustion engine detected by the first step is based on ionic current.

3. A device of estimating heat resistivity for a spark plug, comprising:

(a) an ignition spark control means provided to suppress an ignition spark across electrodes of a spark plug at a predetermined intervals;

(b) a counter means provided to count the numbers of the ignition spark which is suppressed by the ignition spark control means;

(c) a self-ignition detection means provided to detect the self-ignition from the spark plug when the ignition spark is suppressed by the ignition spark control means;

(d) a self-ignition counter means provided to count the numbers of the self-ignition detected by the self-ignition detecting means;

(e) a calculation means provided to calculate occurrence rate of the self-ignition from the spark plug on the basis of the suppressing numbers of the ignition spark counted by the counter means and the detecting numbers of the self-ignition counted by self-ignition counter means;

(f) a self-ignition timing detection means provided to detect a detecting timing of the self-ignition which is detected by the self-ignition detecting means and (g) a preignition timing anticipating means provided to anticipate an ignition timing when preignition of the internal combustion engine occurs on the basis of the occurrence rate of the self-ignition detected by the calculation means and detecting timing of the self-ignition detected by the self-ignition timing detection means.

4. A device of estimating heat resistivity for a spark plug according to claim 3, further comprising: a heat resistivity distinction means provided to recognize heat resistivity allowance based on an ignition timing in which an ignition spark occurs across electrodes of the spark plug, and a ignition timing in which the preignition occurs from the spark plug as anticipated by the preignition timing anticipating means.

* * * * *